(12) United States Patent
Guo

(10) Patent No.: US 11,860,989 B2
(45) Date of Patent: *Jan. 2, 2024

(54) VERIFICATION METHOD AND DEVICE

(71) Applicant: Alibaba Group Holding Limited, Grand Cayman (KY)

(72) Inventor: Shan Guo, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,458

(22) Filed: May 25, 2022

(65) Prior Publication Data

US 2022/0284085 A1     Sep. 8, 2022

Related U.S. Application Data

(63) Continuation of application No. 15/898,071, filed on Feb. 15, 2018, now Pat. No. 11,347,835.

(30) Foreign Application Priority Data

Feb. 20, 2017  (CN) .......................... 201710090776.0

(51) Int. Cl.
| | |
|---|---|
| *G06F 21/36* | (2013.01) |
| *H04L 51/04* | (2022.01) |
| *G06F 3/04845* | (2022.01) |
| *G06F 3/04842* | (2022.01) |

(52) U.S. Cl.
CPC .......... *G06F 21/36* (2013.01); *G06F 3/04842* (2013.01); *G06F 3/04845* (2013.01); *H04L 51/04* (2013.01)

(58) Field of Classification Search
CPC ....... G06F 21/34–36; G06F 2221/2133; G06F 3/04842; G06F 3/04845; H04L 63/08; H04L 63/0853; H04L 51/04
See application file for complete search history.

(56) References Cited

U.S. PATENT DOCUMENTS

| | | |
|---|---|---|
| 8,613,098 B1 | 12/2013 | Pillalamarri et al. |
| 11,347,835 B2 | 5/2022 | Guo |
| 2009/0325661 A1 | 12/2009 | Gross |
| 2010/0325706 A1 | 12/2010 | Tachey |
| 2012/0084450 A1 | 4/2012 | Nagamati et al. |
| 2012/0117222 A1 | 5/2012 | Holloway et al. |
| 2012/0130802 A1 | 5/2012 | Shimizu |
| 2012/0192252 A1 | 7/2012 | Kuo et al. |
| 2013/0007875 A1 | 1/2013 | Jakobsson et al. |
| 2013/0031640 A1 | 1/2013 | Fisk et al. |
| 2013/0132093 A1 | 5/2013 | Gross |
| 2013/0139226 A1 | 5/2013 | Welsch et al. |
| 2013/0205370 A1 | 8/2013 | Kalgi et al. |
| 2014/0058807 A1 | 2/2014 | Altberg et al. |
| 2014/0059668 A1 | 2/2014 | Holloway et al. |

(Continued)

OTHER PUBLICATIONS

McDaniel et al., Embedded Non-Interactive CAPTCHA for Fischer Random Chess, IEEE, 2011.

*Primary Examiner* — Minh Dinh

(57) ABSTRACT

Machine-based verification is minimized by presenting a web page to a user that includes a number of objects in a verification image, and then instructing the user to click on the objects in the verification image in a particular order. The user selected order is then compared to a known correct order, and verification is complete when the user selected order matches the known correct order.

20 Claims, 7 Drawing Sheets

(56) References Cited

U.S. PATENT DOCUMENTS

| | | |
|---|---|---|
| 2014/0316786 A1 | 10/2014 | Gross |
| 2014/0380444 A1 | 12/2014 | Kelley |
| 2015/0032533 A1 | 1/2015 | Raab et al. |
| 2015/0033344 A9 | 1/2015 | Holloway et al. |
| 2015/0039315 A1 | 2/2015 | Gross |
| 2015/0046254 A1 | 2/2015 | Raab et al. |
| 2015/0207814 A1 | 7/2015 | Prince et al. |
| 2015/0269387 A1 | 9/2015 | Cannarsa |
| 2015/0310198 A1 | 10/2015 | Gross |
| 2015/0347731 A1 | 12/2015 | Paxton et al. |
| 2016/0012465 A1 | 1/2016 | Sharp |
| 2016/0014087 A1 | 1/2016 | Holloway et al. |
| 2016/0028730 A1 | 1/2016 | Natarajan et al. |
| 2016/0078370 A1 | 3/2016 | McEwen et al. |
| 2016/0156588 A1 | 6/2016 | Prince et al. |
| 2016/0315948 A1 | 10/2016 | Wan et al. |
| 2016/0328547 A1 | 11/2016 | Gross |
| 2016/0328548 A1 | 11/2016 | Gross |
| 2016/0329046 A1 | 11/2016 | Gross |
| 2016/0371480 A1 | 12/2016 | Cheung et al. |
| 2017/0061115 A1 | 3/2017 | Kalra |
| 2017/0147590 A1 | 5/2017 | Holloway et al. |
| 2017/0160813 A1 | 6/2017 | Divakaran et al. |
| 2017/0161844 A1 | 6/2017 | Rojas |
| 2017/0223132 A1 | 8/2017 | Holloway et al. |
| 2017/0230303 A1 | 8/2017 | Prince et al. |
| 2017/0318008 A1 | 11/2017 | Mead |
| 2017/0346851 A1 | 11/2017 | Drake |
| 2017/0364675 A1 | 12/2017 | Vilke et al. |

VERIFICATION METHOD AND DEVICE

CROSS-REFERENCE TO RELATED APPLICATIONS

This application is a continuation of U.S. patent application Ser. No. 15/898,071, filed on Feb. 15, 2018, which claims priority to Chinese Patent Application No. 201710090776.0, filed on Feb. 20, 2017, the disclosure and content of each of which are incorporated herein by reference in their entireties.

BACKGROUND OF THE INVENTION

1. Field of the Invention

The present application relates to the field of information security and, in particular, to a verification method and device.

2. Description of the Related Art

In the prior art, verification programs are set in multiple browser pages or applications, and information input by users is verified to prevent malicious cyber activity. In order to prevent verification content in the verification process from being automatically recognized by malicious cyber activity, the prior art provides the following verification methods:

(1) A verification code image is presented on a browser page, and a user is prompted to type object words letter by letter in the verification code image to perform verification. In this verification method, the object words in the verification code image are generally an ordered fixed-length string of words. If the verification code is simple, a machine quickly recognizes it and the letters of the object words can be input through the machine, lowering the verification security. If the verification code is complex, it is also difficult for a human to recognize it, assuring a high rate of verification failure. Moreover, the user is required to input the object words in this method, making it a complicated operation.

(2) A verification image matrix and object prompt message are presented to prompt a user to select an object image from the verification image matrix. In this verification method, generally one object is prompted in the object prompt message, the verification image matrix has multiple answers, and if a high resolution verification image matrix is set, the verification image matrix is easily learned and recognized by a machine, lowering the verification security. If a low resolution verification image matrix is set, the verification image matrix has poor discrimination and is also difficult for the user to recognize, assuring a high rate of verification failure.

No effective solution has been proposed at present for the aforementioned problem of low verification security.

SUMMARY OF THE INVENTION

The present invention provides a verification process that is difficult for a machine to execute without human interaction, thereby limiting the ability of bots to enter human-only sites. The present invention includes a verification method. The verification method comprises generating a random sequence of randomly determined objects. The verification method also comprises generating a verification image that comprises a plurality of object images for the randomly determined objects, and a message that instructs a user to sequentially click on the plurality of object images in the verification image in a specified order. The verification method also comprises converting the message into a picture.

The present invention also includes a non-transitory computer-readable medium that has computer executable instructions stored thereon that when executed by a processor cause the processor to implement a method of verification. The method comprises generating a random sequence of randomly determined objects. The method also comprises generating a verification image that comprises a plurality of object images for the randomly determined objects, and a message that instructs a user to sequentially click on the plurality of object images in the verification image in a specified order. The method also comprises converting the message into a picture.

The present invention additionally includes a verification device. The verification device comprises a memory that stores instructions, and a processor coupled to the memory. The processor to execute the instructions to generate a random sequence of randomly determined objects. The processor to further generate a verification image that comprises a plurality of object images for the randomly determined objects, and a message that instructs a user to sequentially click on the plurality of object images in the verification image in a specified order. Further, the processor to further convert the message into a picture.

A better understanding of the features and advantages of the present invention will be obtained by reference to the following detailed description and accompanying drawings which set forth an illustrative embodiment in which the principals of the invention are utilized.

BRIEF DESCRIPTION OF THE DRAWINGS

The accompanying drawings described herein are used for providing further understanding of the present application and constitute a part of the present application. Exemplary embodiments of the present application and the description thereof are used for explaining the present application instead of constituting improper limitations on the present application.

DETAILED DESCRIPTION OF THE INVENTION

Figure 1:
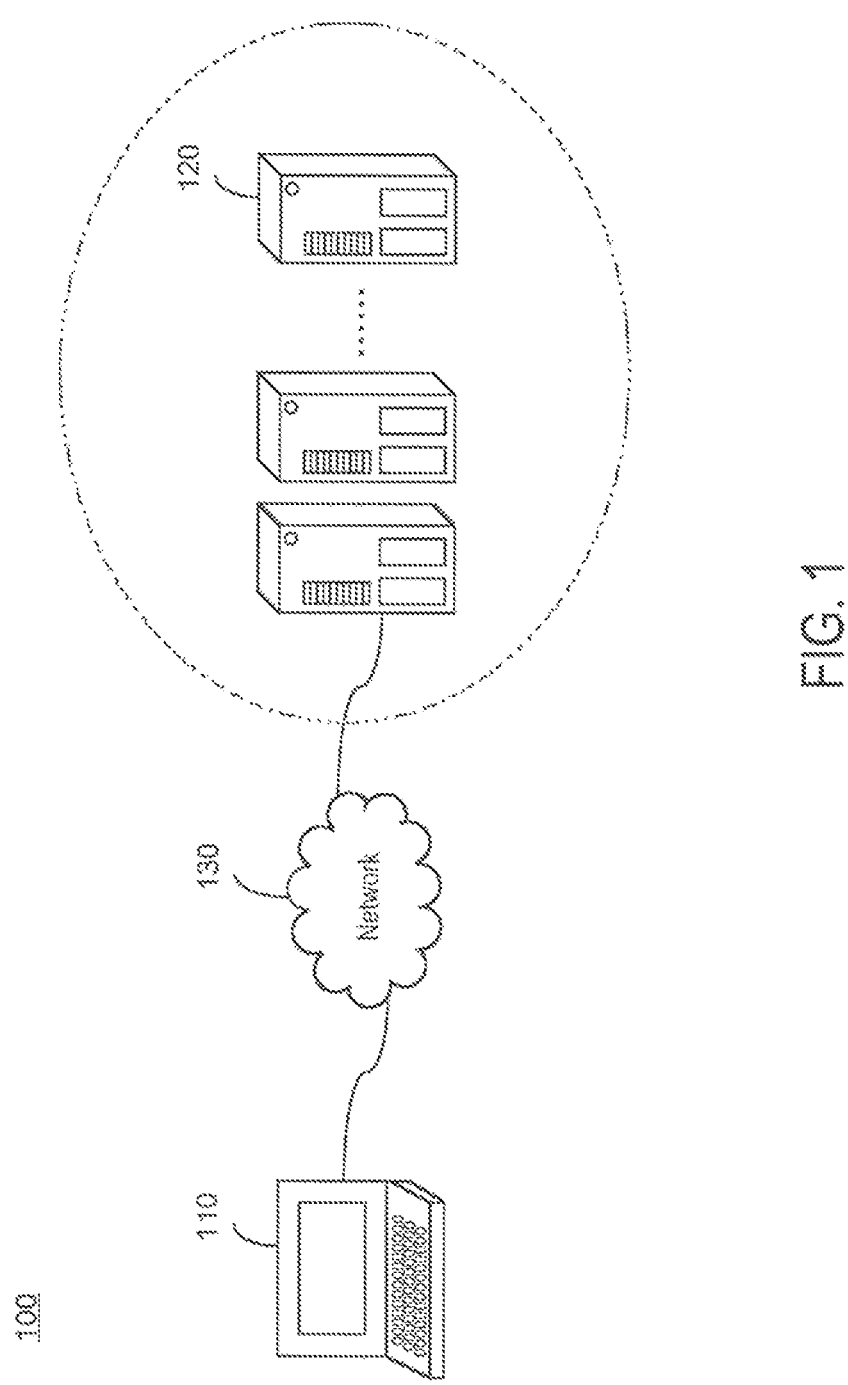
FIG. 1 is a diagram illustrating an example of a computer system 100 in accordance with the present invention.

To enable those skilled in the art to better understand the solutions of the present application, the technical solutions in the embodiments of the present application will be described clearly and completely below with reference to the drawings in the embodiments of the present application. It is apparent that the described embodiments are merely some, rather than all, of the embodiments of the present application. On the basis of the embodiments in the present application, all other embodiments obtained by those of ordinary skill in the art without making creative efforts shall fall within the protection scope of the present application.

It should be noted that the terms such as "first" and "second" in the specification, the claims, and the aforementioned drawings of the present application are used to distinguish between similar objects, and are not necessarily used to describe a specific sequence or priority. It should be understood that numbers used in this way are interchangeable in a suitable situation, so that the embodiments of the present application described herein can be implemented in a sequence in addition to a sequence shown or described herein. In addition, terms such as "include" and "have" and any variation thereof are intended to cover non-exclusive inclusion, for example, processes, methods, systems, products, or apparatuses including a series of steps or units are not necessarily limited to the steps or units that are clearly listed, and may include other steps or units that are not dearly listed or that are inherent to the processes, methods, products, or apparatuses.

The following interpretation applies to Verification code (CAPTCHA): a public automatic program for recognizing whether a user is a computer or a human. The verification code can be used to prevent malicious password cracking, ticket brushing, and forum trolling. The verification code can also effectively prevent a certain hacker from making constant login attempts on a specific registered user by brute-force cracking using a specific program.

It should be noted that steps shown in the flowcharts in the drawings may be executed in a computer system, such as a set of computer executable instructions. Furthermore, although the logic sequence is shown in the flowcharts, in some cases, the shown or described steps may be executed in a sequence different from the sequence herein.

FIG. 1 shows a diagram that illustrates an example of a computer system 100 in accordance with the present invention. As shown in FIG. 1, computer system 100 includes a terminal 110, a server 120, and a network 130 that couples terminal 110 to server 120.

Terminal 110 can be implemented with, but is not limited to, any mobile computing device, such as a smart phone, as well as a computer terminal, a tablet computer, or a similar computing device. Network 130 can be implemented with, but is not limited to, a wide area network, a metropolitan area network, a local area network, the internet, or other types of data networks.

Terminal 110 may perform a network service that is performed by a server or a group of servers. A network server is a network-based user service, such as a verification service, a social networking service, a cloud resource, email, online payment, or other online applications.

In operation, terminal 110 establishes a connection to server 120 through data network 130 by generating and sending a verification request to server 120. Server 120 generates a verification image and a prompt message, and presents the verification image and the prompt message to terminal 110 for display to a user. For example, the prompt message can instruct the user to click on a number of objects within the verification image in a particular order.

The user may input operations on terminal 110 in response to the prompt message, such as by clicking a number of positions on the verification image. Terminal 110 records the positions on the verification image that were clicked on by the user, and submits the information of the positions that were clicked on by the user to server 120 for verification. Performing the verification method in this embodiment of the present invention by terminal 110 is performing the verification method by client software installed thereon.

In an alternative embodiment, the verification method is applied to terminal 110, that is, the verification method in this embodiment of the present invention can be implemented without the need to include a server in the network environment. Specifically, a processor of terminal 110 receives a generated verification request and sends the verification request to a verification processor of terminal 110 (the verification processor may be a virtual processing unit in the processor of terminal 110). Terminal 110 generates a verification image and a prompt message, and displays the verification image and the prompt message to a user. The user may input operations on a screen of terminal 110. The processor records the positions clicked on by the user on the verification image, and verifies the submitted information of the positions clicked on by the user.

It should be noted herein that terminal 100 shown in FIG. 1 can include a touch display (also referred to as "touch screen" or "touch display screen"). In some embodiments, terminal 110 (or mobile apparatus) shown in FIG. 1 has a graphical user interface (GUI) that allows the user to perform man-machine interaction with the GUI through finger contact on the touch screen surface and/or a gesture.

The man-machine interaction function includes the following interactions: inputting a predetermined verification operation, webpage creating, plotting, word processing, electronic document making, gaming, video conferencing, instant messaging, receiving and sending of emails, call interfacing, digital video playing, digital music playing and/or network browsing, and so on. Executable instructions for executing the man-machine interaction function are configured/stored in one or more processor executable computer program products or readable storage media.

Figure 2A:
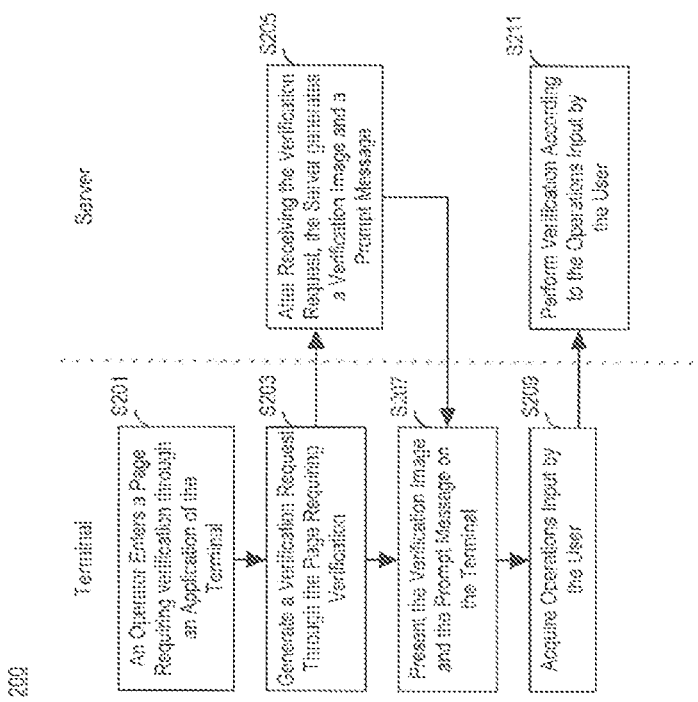
FIG. 2(a) is a flow chart illustrating an example of a verification method 200 in accordance with the present invention.

FIG. 2(a) shows a flow chart that illustrates an example of a verification method 200 in accordance with the present invention. As shown in FIG. 2(a), method 200 includes the following steps.

Step S201: An operator enters a page requiring verification through an application of a terminal, such as terminal 110.

Step S203: Generate a verification request through the page requiring verification.

The page may be an information presentation page in the application, or may be a browser page (not limited in the present invention), so as to generate a verification request. The verification request may be generated by triggering entry into the page requiring verification. The verification request may also be generated by performing an operation requiring verification on the page requiring verification. For example, a submit operation is performed on the page requiring verification, and a verification request is generated upon detecting that execution of the submit operation needs to be verified. The aforementioned methods for generating a verification request are merely examples for description and do not specifically limit the present application.

Step S205: After receiving the verification request, a server, such as server 120, generates a verification image and a prompt message.

Step S207: Display the verification image and the prompt message on the terminal.

After generating the verification image and the prompt message, the server may send the verification image and the prompt message to the terminal, and in an embodiment, may send the verification image and the prompt message together to a client (logging in to the terminal).

After receiving the verification image and the prompt message, the terminal presents the verification image and the prompt message in a predetermined format. For example, the prompt message is presented in the upper left corner, top center, upper right corner, lower left corner, bottom center, or lower right corner of the verification image, or the prompt message is presented in an empty area of the verification image. Therefore, the location of the prompt message is not limited in the present invention.

Step S209: Acquire operations input by the user.

The user may sequentially click corresponding positions on the verification image according to the prompt message, and the terminal records the operations input by the user. The user may submit verification after the operations are complete, and the terminal may submit the recorded operations input by the user to the server.

Step S211: Perform verification according to the operations input by the user.

It is verified whether the operations input by the user are consistent with the order of position information of the multiple objects in a predetermined range. If yes, the verification is successful. Otherwise, the verification is unsuccessful.

Figure 2B:
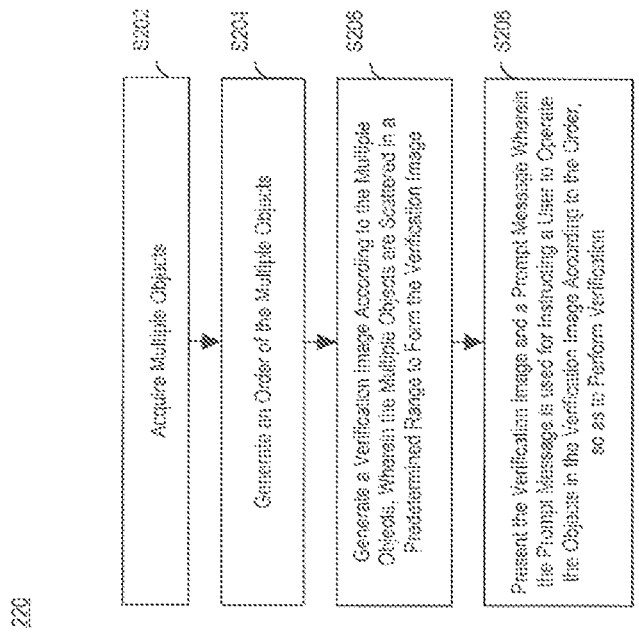
FIG. 2(b) is a flow chart illustrating a method 220 that generates a verification image and a prompt message in accordance with the present invention.

FIG. 2(b) shows a flow chart that illustrates a method 220 that generates a verification image and a prompt message in accordance with the present invention. Method 220, which can be used to implement step S205 in FIG. 2(a), includes the following steps.

Step S202: Acquire multiple objects.

The terminal sends the generated verification request to the server, and the server acquires multiple objects for verification in response to the verification request.

In an alternative embodiment, multiple objects may be pre-stored in a database, and upon receiving a verification request, the server randomly determines the quantity and type of objects, and acquires multiple objects from the database according to the randomly determined quantity and type of the objects. The random determining operation herein may be implemented through a random function. In another embodiment, the server acquires a group of pre-stored information from the database, wherein the information contains multiple objects.

In still another embodiment, the server may collect objects (for example, word objects "How", "are", "you", and "?") generated by the user in the historical verification process, and store them in the database. Upon receiving a verification request, the server extracts one or more historically collected objects from the database.

The multiple objects for verification comprise: one or more words and/or pictures recording entity information or words. For example, the objects may be words "Patent" and "Invention." In an embodiment, the quantity of the multiple objects may be a fixed quantity or an unfixed quantity, that is, the number of objects may also be variable. For example, the multiple objects may be four objects: "How", "are", "you", and "?", or may be two objects: "Patent" and "Invention", and are therefore not limited in the present invention.

The entities in the aforementioned embodiment may refer to any tangible substances existing objectively in nature, for example, animals, plants, fruits, buildings, or head portraits.

Step S204: Generate an order of the multiple objects.

In an embodiment, an order of the multiple objects may be randomly generated using a random function. For example, a number of each object is set, a sequence corresponding to multiple numbers is generated, and the order of the multiple objects is set corresponding to the order of the numbers in the sequence. For example, four object words "How", "are", "you", and "?" are acquired, numbers of the four object words are set, which are respectively: "How" corresponds to 1, "are" corresponds to 2, "you" corresponds to 3, and "?" corresponds to 4, a sequence "2134" of the numbers is generated, and then the determined order of the multiple objects is "are", "How", "you", and "?".

In another embodiment, the order of the multiple objects is generated according to an acquisition order of the multiple objects.

Step S206: Generate a verification image according to the multiple objects, wherein the multiple objects are scattered in a predetermined range to form the verification image.

In an embodiment, a verification image corresponding to the multiple objects is generated according to a predetermined range, wherein the predetermined range is a predetermined size of the verification image. In an embodiment, the predetermined range is consistent with the size of the finally generated verification image.

The generating a verification image corresponding to the multiple objects according to a predetermined range includes determining coordinates in the predetermined range corresponding to an object quantity, selecting a coordinate of each object from the determined coordinates, and generating the verification image according to the coordinate and the multiple objects, wherein a coordinate of an object in the verification image matches the object coordinate selected from the determined coordinates.

In an embodiment, if a vector difference between the coordinate of the object in the verification image and the object coordinate selected from the determined coordinates is less than a predetermined vector difference, it is determined that the coordinate of the object in the verification image matches the object coordinate selected from the determined coordinates. Otherwise, it is determined that the coordinate of the object in the verification image does not match the object coordinate selected from the determined coordinates.

Further, in an embodiment, the determining coordinates in the predetermined range corresponding to an object quantity may be implemented by acquiring a quantity of the multiple objects, and randomly generating the coordinates in the predetermined range corresponding to the object quantity after determining the quantity of the multiple objects.

It should be further noted that after the coordinates corresponding to the quantity of the multiple objects are randomly generated in the predetermined range, it is detected whether a distance between every two coordinates is greater than a predetermined safe distance. If the distance between every two coordinates is greater than the safe distance, the generated coordinates are determined as coordinates of the multiple objects. If the distance between every two coordinates is less than the safe distance, the generated coordinates are adjusted so that the distance between every two coordinates is greater than the predetermined safe distance.

In the aforementioned embodiment, the predetermined safe distance may be a preset distance, and the distance between the coordinates or the predetermined safe distance may be represented by pixels or a vector length. For example, the quantity of pixels between two coordinates is determined as a distance between the two coordinates, or the length of a vector formed by two coordinates is set as a distance between the two coordinates.

The predetermined safe distance may be a distance prestored in the database, or may be determined based on information lengths of the multiple objects. In an embodiment, a maximum information length in the multiple objects is set as the predetermined safe distance. For example, a maximum information length in the multiple objects is 15 pixels, and then the predetermined safe distance is 15 pixels.

Through the aforementioned embodiment, the relationship between coordinates of the objects is defined so that the objects do not overlap each other in the generated verification image, thereby facilitating user recognition.

In the aforementioned embodiment, a verification image is generated according to multiple objects so that the randomicity of generating the verification image is further increased, and the security of a verification code is further improved.

Further, a corresponding verification answer may be generated while or after the verification image is automatically generated according to the multiple generated objects.

In an embodiment, while the verification image is automatically generated according to the multiple generated objects, position information of the objects in the verification image can be obtained, and multiple pieces of ordered position information are generated to serve as an answer for determining whether the verification is successful.

Specifically, the position information may be a coordinate point or a size range. For example, a central coordinate of each object is acquired and the acquired central coordinate is set as position information of the object, and so on, so as to obtain multiple pieces of position information of the multiple objects.

For another example, a size of each object is acquired, and a size range corresponding to each object is determined based on the size. Further, after the size of each object is acquired, the size is enlarged by a predetermined ratio, and the size after enlargement is determined as a size range corresponding to each object.

In this embodiment, an enlarged size of an object is used as a size range corresponding to the object, instead of directly using a size of the object as the size range of the object, thereby avoiding failure to perform verification due to the deviation of a manual operation position of a user, and increasing the verification success rate.

Step S208: Present the verification image and prompt message, wherein the prompt message is used for instructing a user to operate the objects in the verification image according to the order so as to perform verification.

After the verification image is generated, the server generates the prompt message corresponding to the verification image to prompt the user to sequentially operate the objects in the verification image to perform verification, and presents the verification image and the prompt message to the user.

For example, the prompt message can be "Please sequentially click "Patent" and "Invention" in the figure", or "Please sequentially click 'Apple, Banana, and Cup' in the figure", or "Please sequentially click 'Apple, Patent, and Banana' in the figure", or the like.

In an embodiment, when the objects are pictures, generating a verification image according to the multiple objects may include acquiring at least one of the multiple pictures for variation processing, and generating the verification image using the multiple pictures after the variation processing. The variation processing includes at least one of transformation, rotation, scaling, and blurring.

The transformation operation refers to "narrowing" by a lens or digital processing method in a horizontal direction or a vertical direction so as to change an original aspect ratio of a picture without changing the resolution of the picture. The rotation operation refers to an operation of rotating a picture about a vertex by a certain angle in a plane.

The scaling operation refers to a process of adjusting the size of a picture. After the size of a picture is increased, the visibility of pixels constituting the picture becomes higher. On the contrary, shrinkage of a picture increases the smoothness and definition of the picture. The blurring operation may refer to an operation of reducing the resolution of a picture.

In an alternative embodiment, presenting the prompt message includes presenting the prompt message using text, or converting the prompt message into a picture and displaying the picture.

Through the aforementioned embodiment, the prompt message for multiple ordered objects may be presented to the user by text or by converting the prompt message into an image, and the conversion of the prompt message into an image can further improve security and avoid automatic recognition and attack by a machine.

In order to further increase the difficulty of recognizing a verification code by a machine, converting the prompt message into a picture and displaying the picture includes adding interference information to a region in the picture wherein the prompt message is displayed, and displaying the picture to which the interference information is added. The interference information is used for covering or disturbing a meaning expressed by the prompt message.

In order to increase the difficulty of recognizing a verification code by the machine without affecting the user's recognition of the objects, resolutions of the objects and the interference information may be set to be different. For example, the set resolution of the objects is higher than the resolution of the interference information. Further, in an embodiment, a difference between the resolution of the objects and the resolution of the interference information is less than a predetermined difference.

According to the aforementioned embodiment of the present application, the presenting prompt message may comprise sending the prompt message to the user through a short message or instant messaging tool so as to present the prompt message.

In an embodiment, the verification image is presented on the screen of the terminal, and the prompt message is sent to the user through a short message or other instant messaging tools (for example, an instant application) so that the verification image and the prompt message can be sent separately. In this way, even if the machine recognizes information in the verification image, the verification operation cannot be accurately performed as the order prompted by the prompt message cannot be known, thereby further ensuring verification security.

According to the aforementioned embodiment of the present invention, after the verification image has been generated according to the multiple objects, the method may further include determining position information of the multiple objects in the predetermined range, and acquiring position information of operations performed by the user in the predetermined range. In addition, the method includes recording an order of the position information of the performed operations, and determining whether the order of the position information of the operations performed by the user is consistent with an order of the position information of the multiple objects in the predetermined range. If yes, the verification is successful.

In an embodiment, the multiple pieces of ordered position information submitted by the user are compared with the automatically generated answer in the aforementioned embodiment to determine whether they are consistent and, if yes, the verification is successful. Otherwise, the verification is unsuccessful. When the judgment is made, the position information is not required to be completely the same for the sake of fault tolerance.

In an embodiment, the aforementioned operations may be click operations. Position information of the multiple objects in the predetermined range is determined, position information of operations performed by the user in the predetermined range is acquired, and an order of the position information of the performed operations is recorded. It is determined whether the order of the position information of the operations performed by the user is consistent with an order of the position information of the multiple objects in the predetermined range. If yes, the verification is successful.

In this embodiment of the present application, a user sequentially clicks multiple objects on an image and it is verified whether the click order and positions are correct so as to complete the verification process. The verification process can be completed with just clicks from the user, thereby simplifying the operation process. Meanwhile, a verification answer is ordered and variable in length and position information is automatically and randomly generated, making it difficult to be recognized by the machine so that manual judgment is required, thus achieving higher security.

Figure 3:
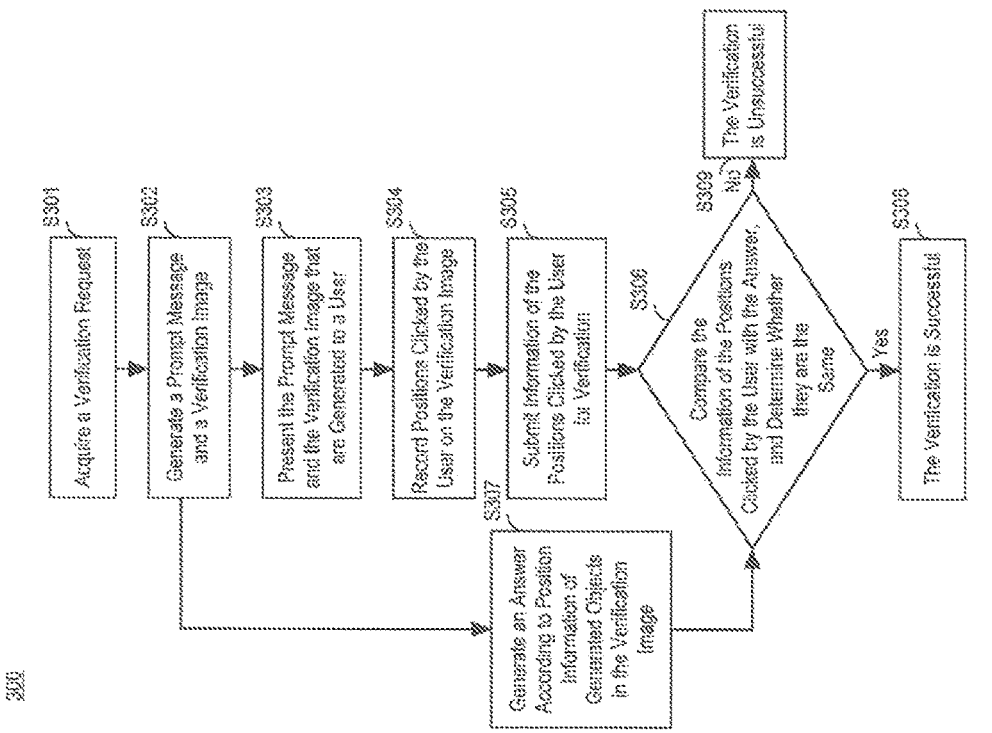
FIG. 3 is a flow chart illustrating an example of a verification method 300 in accordance with the present invention.

FIG. 3 shows a flow chart that illustrates an example of a verification method 300 in accordance with the present invention. Method 300 includes the following steps.

Step S301: Acquire a verification request.

Step S302: Generate a prompt message for multiple ordered objects and a verification image.

In an embodiment, after a verification request is received, multiple ordered objects are automatically generated, a prompt message for prompting the order is generated, and a verification image is automatically generated according to the multiple generated objects. In an embodiment, while the verification image is generated, step S307 may be performed. In step S307, an answer is generated according to position information of the generated objects in the verification image. That is, multiple pieces of ordered position information are generated according to the position information of the generated objects in the verification image so as to serve as the answer for determining whether the verification is successful.

The objects for verification may be words, or may be of a recognizable type such as articles. In addition, the number of the objects may also be variable. For example, the objects for verification may be "Please sequentially click 'Patent' and 'Invention' in the figure", or may be "Please sequentially click 'Apple', 'Banana', and 'Cup' in the figure", or may be "Please sequentially click 'Apple', 'Patent', and 'Banana' in the figure", or the like.

Step S303: Present the verification image and the prompt message that are generated to a user.

In an embodiment, the prompt message for the multiple ordered objects and the verification image that are generated are together presented to the user. The prompt message for the multiple ordered objects may be presented to the user by text or by converting the prompt message into an image, and the conversion of the prompt message into an image can further improve security and avoid automatic recognition and attack by the machine.

Step S304: Record positions clicked on by the user on the verification image.

In an embodiment, operations of the user sequentially clicking corresponding positions on the verification image according to the prompt message are received, and information of the positions clicked on by the user s recorded in turn through a system.

Step S305: Submit the information of the positions clicked on by the user for verification.

In an embodiment, the user submits verification after completing clicking, and the system submits the received position information for verification. After the user completes clicking, the system may automatically enter the verification process, or the user may submit verification by clicking "OK".

Step S306: Compare the information of the positions clicked on by the user with the answer, and determine whether they are the same.

In an embodiment, multiple pieces of ordered position information of the operations of the user are compared with the automatically generated answer to determine whether they are consistent. If yes, step S308 is performed. Otherwise, step S309 is performed and the verification is unsuccessful.

Further, in an embodiment, when the judgment is made, the position information is not required to be completely the same for the sake of fault tolerance.

In the aforementioned embodiment, a verification answer is ordered and variable in length and position information is randomly generated, making it difficult to be recognized by the machine so that manual judgment is required, thus improving verification security.

Figure 4:
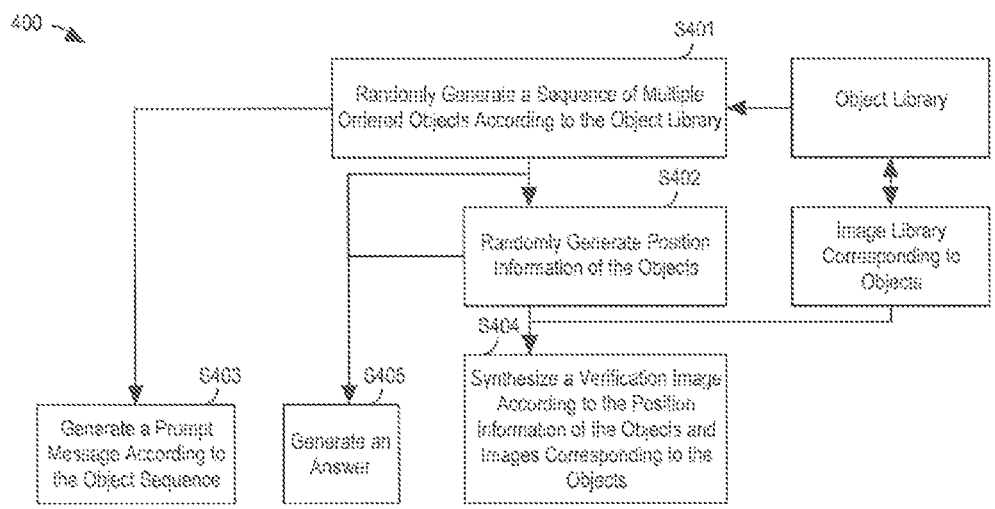
FIG. 4 is a flow chart illustrating an example of a method 400 in accordance with the present invention.

FIG. 4 shows a flow chart that illustrates an example of a method 400 in accordance with the present invention. Method 400 generates a verification image, a prompt message, and an answer. In an embodiment, an object library and an image library (or a vector library) corresponding to objects may be prepared offline in advance, and data in the libraries may be self-defined according to the situation. Each object, in turn, may correspond to multiple pieces of image or vector data, Method 400 includes the following steps.

Step S401: Randomly generate a sequence of multiple ordered objects according to the object library.

For example, "Apple, Patent, and Banana", Meanwhile, image data or vector data corresponding to each object may be obtained. If the object corresponds to multiple pieces of image or vector data, one piece of image or vector data is randomly selected.

Step S402: Randomly generate position information of the objects.

In an embodiment, position information is randomly generated for each object in a size range of a verification image. The position information generated herein should be properly scattered to avoid obstructing each other by object images.

Step S403: Generate a prompt message according to the object sequence, for example, "Please sequentially click 'Apple, Patent, and Banana' in the figure".

Step S404: Synthesize a verification image according to the position information of the objects and images corresponding to the objects.

In an embodiment, image data or vector data corresponding to each object is transformed, for example, rotated or scaled, to a certain extent so as to generate new object image data and synthesize the final verification image.

Step S405: Generate an answer. In an embodiment, a group of multiple pieces of ordered position information is obtained according to the object sequence and position information corresponding to the objects so as to serve as the verification answer.

In an embodiment, a verification image may be generated before a verification request is made, so as to reduce the time of the verification process.

Through the aforementioned embodiment, an ordered, variable-length, and random-position verification answer can be randomly generated, and verification objects are set as more than a single type of objects, words, articles, other recognizable articles, and so on. Through the aforementioned embodiment, a user performs verification by clicking so that the operation is simple, easy recognition for humans, and difficult recognition for machines are achieved, thereby greatly improving verification security.

It should be noted that in order to describe the foregoing method embodiments briefly, all the method embodiments are expressed as a combination of a series of actions, but those skilled in the art should know that the present application is not limited by the sequence of the described actions because certain steps can adopt other sequences or can be carried out at the same time according to the present application. Secondly, those skilled in the art should also know that all the embodiments described in the specification belong to preferred embodiments, and the involved actions and modules are not necessarily required by the present application.

Through the preceding description of the embodiments, those skilled in the art can clearly understand that the method according to the aforementioned embodiment may be implemented by software plus a necessary general hardware platform, and certainly may also be implemented by hardware. In most cases, however, the former is the preferred implementation. Based on such understanding, the essence of the technical solutions of the present application or the part that makes contributions to the prior art may be embodied in the form of a software product. The computer software product is stored in a storage medium (for example, a ROM/RAM, a magnetic disk, or an optical disc) and includes several instructions for instructing a terminal apparatus (which may be a mobile phone, a computer, a server, a network apparatus, or the like) to perform the methods described in the embodiments of the present application.

Figure 5:
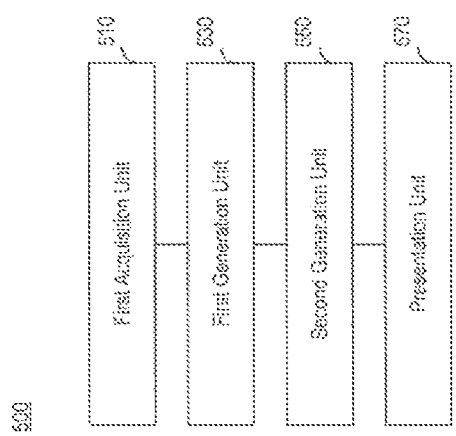
FIG. 5 is a block diagram illustrating an example of a verification device 500 in accordance with the present invention.

FIG. 5 shows a block diagram that illustrates an example of a verification device 500 in accordance with the present invention. Verification device 500 can implement the aforementioned verification method. As shown in FIG. 5, verification device 500 includes a first acquisition unit 510, which is configured to acquire multiple objects, and a first generation unit 530, which is configured to generate an order of the multiple objects.

As further shown in FIG. 5, verification device 500 also includes a second generation unit 550, which is configured to generate a verification image according to the multiple objects. The multiple objects, in turn, are scattered in a predetermined range to form the verification image, Device 500 further includes a presentation unit 570, which is configured to present the verification image and a prompt message. The prompt message is used for instructing a user to operate the objects in the verification image according to the order so as to perform verification.

Through the aforementioned embodiment, after first acquisition unit 510 acquires multiple objects, an order of the multiple objects is generated by first generation unit 530, and a verification image is generated by second generation unit 550 according to the multiple objects. The multiple objects are scattered in a predetermined range to form the verification image, and the verification image and the prompt message are presented by the presentation unit. The prompt message is used for instructing a user to operate the objects in the verification image according to the order so as to perform verification. In the aforementioned embodiment, multiple ordered objects are generated, and the multiple ordered objects are scattered in a predetermined range to generate a verification image, and a user is prompted to perform verification according to the order of the multiple objects. Since both the objects and the order of the objects are randomly generated, it is difficult for the machine to recognize them, thereby solving the problem of low verification security in the prior art and improving verification security.

In an embodiment, triggered by a request for generating a verification image, multiple objects are acquired. A page requiring verification (the page may be an information presentation page in an application, or may be a browser page, therefore it is not limited in the present application) is entered through a screen of a terminal so as to generate a verification request. The verification request may be generated by triggering entry into the page requiring verification. The verification request may also be generated by performing an operation requiring verification on the page requiring verification. For example, a submit operation is performed on the page requiring verification, and a verification request is generated upon detecting that execution of the submit operation needs to be verified. The aforementioned method for generating a verification request is merely an example for description and does not specifically limit the present application.

After a verification request is generated, the verification request is sent to a server or a verification processor of the terminal, and the verification processor acquires multiple objects in response to the verification request. The objects are objects for verification, and the objects are represented in many forms. For example, the objects for verification may be words, or may be of a recognizable type such as articles. For example, the objects may be words "Patent" and "Invention", In an embodiment, the quantity of the objects may be a fixed quantity or an unfixed quantity, that is, the number of the objects may also be variable. For example, the objects may be words "How", "are", "you", and "?", or may be words "Patent" and "Invention". Therefore, the objects are not limited in the present invention.

In an alternative embodiment, multiple objects may be pre-stored in a database, and upon receiving a verification request, the quantity and type of objects are randomly determined, and multiple objects are acquired from the database according to the randomly determined quantity and type of the objects. The random determining operation herein may be implemented through a random function.

In an alternative embodiment, a sequence of multiple objects is randomly generated, and an order of the multiple objects is set according to the sequence.

In an alternative embodiment, an order of multiple objects is randomly generated. For example, a number of each object is set, a sequence corresponding to multiple numbers is generated, and the order of the multiple objects is set corresponding to the order of the numbers in the sequence. For example, four object words "How", "are", "you", and "?" are acquired, numbers of the four object words are set, which are respectively: "How" corresponds to 1, "are" corresponds to 2, "you" corresponds to 3, and "?" corresponds to 4, a sequence "2134" of the numbers is generated, and then the determined order of the multiple objects is "are", "How", "you", and "?".

In another alternative embodiment, the order of the multiple objects is generated according to an acquisition order of the multiple objects.

In an embodiment, a verification image corresponding to the multiple objects is generated according to a predetermined range, wherein the predetermined range is a predetermined size of the verification image. In an embodiment, the predetermined range is consistent with the size of the finally generated verification image.

The generating a verification image corresponding to the multiple objects according to a predetermined range includes determining coordinates in the predetermined range corresponding to an object quantity, selecting a coordinate of each object from the determined coordinates, and generating the verification image according to the coordinate and the multiple objects, wherein a coordinate of an object in the verification image matches the object coordinate selected from the determined coordinates.

In an embodiment, if a vector difference between the coordinate of the object in the verification image and the object coordinate selected from the determined coordinates is less than a predetermined vector difference, it is determined that the coordinate of the object in the verification image matches the object coordinate selected from the determined coordinates. Otherwise, it is determined that the coordinate of the object in the verification image does not match the object coordinate selected from the determined coordinates.

Further, in an embodiment, the determining coordinates in the predetermined range corresponding to an object quantity may be implemented by acquiring a quantity of the multiple objects, and randomly generating the coordinates in the predetermined range corresponding to the object quantity after determining the quantity of the multiple objects.

It should be further noted that after the coordinates corresponding to the quantity of the multiple objects are randomly generated in the predetermined range, it is detected whether a distance between every two coordinates is greater than a predetermined safe distance. In addition, if the distance between every two coordinates is greater than the safe distance, the generated coordinates are determined as coordinates of the multiple objects. Further, if the distance between every two coordinates is greater than the safe distance, the generated coordinates are adjusted so that the distance between every two coordinates is greater than the predetermined safe distance.

In the aforementioned embodiment, the predetermined safe distance may be a preset distance, and the distance between the coordinates or the predetermined safe distance may be represented by pixels or a vector length. For example, the quantity of pixels between two coordinates is determined as a distance between the two coordinates, or the length of a vector formed by two coordinates is set as a distance between the two coordinates.

The predetermined safe distance may be a distance prestored in the database, or may be determined based on information lengths of the multiple objects. In an embodiment, a maximum information length in the multiple objects is set as the predetermined safe distance. For example, a maximum information length in the multiple objects is 15 pixels, and then the predetermined safe distance is 15 pixels.

Through the aforementioned embodiment, the relationship between coordinates of the objects is defined so that the objects do not overlap each other in the generated verification image, thereby facilitating user recognition.

In an embodiment, while the verification image is automatically generated according to the multiple generated objects, position information of the objects in the verification image can be obtained, and multiple pieces of ordered position information are generated to serve as an answer for determining whether the verification is successful.

Specifically, the position information may be a coordinate point or a size range. For example, a central coordinate of each object is acquired and the acquired central coordinate is set as position information of the object, and so on, so as to obtain multiple pieces of position information of the multiple objects.

For another example, a size of each object is acquired, and a size range corresponding to each object is determined based on the size. Further, after the size of each object is acquired, the size is enlarged by a predetermined ratio, and the size after enlargement is determined as a size range corresponding to each object.

In this embodiment, an enlarged size of an object is used as a size range corresponding to the object, instead of directly using a size of the object as the size range of the object, thereby avoiding failure to perform verification due to the deviation of a manual operation position of a user, and increasing the verification success rate.

In an embodiment, the presentation unit includes either a first presentation module, which is configured to present the prompt message using text, or a first display module, which is configured to convert the prompt message into a picture and display the picture.

After the verification image is generated, the prompt message corresponding to the verification image is generated to prompt the user to sequentially operate the objects in the verification image to perform verification, and the verification image and the prompt message are presented to the user.

For example, the prompt message may be "Please sequentially click 'Patent' and 'Invention' in the figure", or "Please sequentially click 'Apple, Banana, Cup' in the figure", or "Please sequentially click 'Apple, Patent, Banana' in the figure", or the like.

In an embodiment, when the objects are pictures, the generating a verification image according to the multiple objects includes acquiring at least one of the multiple pictures for variation processing, and generating the verification image using the multiple pictures after the variation processing. The variation processing includes one or more of a transformation, rotation, scaling, and blurring.

Through the aforementioned embodiment, prompt message for multiple ordered objects may be presented to the user by text or by converting the prompt message into an image, and the conversion of the prompt message into an image can further improve security and avoid automatic recognition and attack by the machine.

In an embodiment, the first display module includes an adding submodule, which is configured to add interference information to a region in the picture wherein the prompt message is displayed, and a display submodule, which is configured to display the picture to which the interference information is added. The interference information is used for partially covering or disturbing a meaning expressed by the prompt message.

In order to increase the difficulty of recognizing a verification code by the machine without affecting the user's recognition of the objects, resolutions of the objects and the interference information may be set to be different. For example, the set resolution of the objects is higher than the resolution of the interference information. Further, in an embodiment, a difference between the resolution of the objects and the resolution of the interference information is less than a predetermined difference.

According to the aforementioned embodiment, the presentation unit may comprise a sending module, which is configured to send the prompt message to the user through a short message or instant messaging tool so as to present the prompt message.

In an alternative embodiment, the second generation unit includes an acquisition module, which is configured to acquire, when the objects are pictures, at least one of the multiple pictures for variation processing, and a generation module, which is configured to generate the verification image using the multiple pictures after the variation processing. The variation processing includes one or more of transformation, rotation, scaling, and blurring.

Further, in an embodiment, the device further includes a first determining unit that is configured to determine position information of the multiple objects in the predetermined range after the verification image is generated according to the multiple objects. The device also includes a second acquisition unit that is configured to acquire position information of operations performed by the user in the predetermined range, and record an order of the position information of the performed operations. The device further includes a second determining unit that is configured to determine whether the order of the position information of the operations performed by the user is consistent with an order of the position information of the multiple objects in the predetermined range. If yes, the verification is successful.

In this embodiment of the present application, a user sequentially clicks multiple objects on the verification image, and it is verified whether the click order and positions are correct so as to complete the verification process. The verification process can be completed with just clicks from the user, thereby simplifying the operation process. Meanwhile, a verification answer is ordered and variable in length and position information is automatically and randomly generated, making it difficult to be recognized by a machine so that manual judgment is required, thus achieving higher security.

It should be noted herein that the example and application scenario for implementing the aforementioned modules are the same as those of the corresponding steps, but are not limited to the contents disclosed in the aforementioned embodiment. It should be noted that the aforementioned modules, as a part of the device, may run in the hardware environment shown in the aforementioned embodiment, and may be implemented by software, or may be implemented by hardware.

An embodiment of the present application may provide a computer terminal, wherein the computer terminal may be any computer terminal apparatus in a computer terminal group. In an embodiment, in this embodiment, the aforementioned computer terminal may also be replaced with a terminal apparatus such as a mobile terminal.

In an embodiment, the aforementioned computer terminal may be at least one network apparatus in multiple network apparatuses located in a computer network. The method embodiment provided in FIGS. 2(*a*) and 2(*b*) may be implemented in a mobile terminal, a computer terminal, or a similar computing device.

Figure 6:
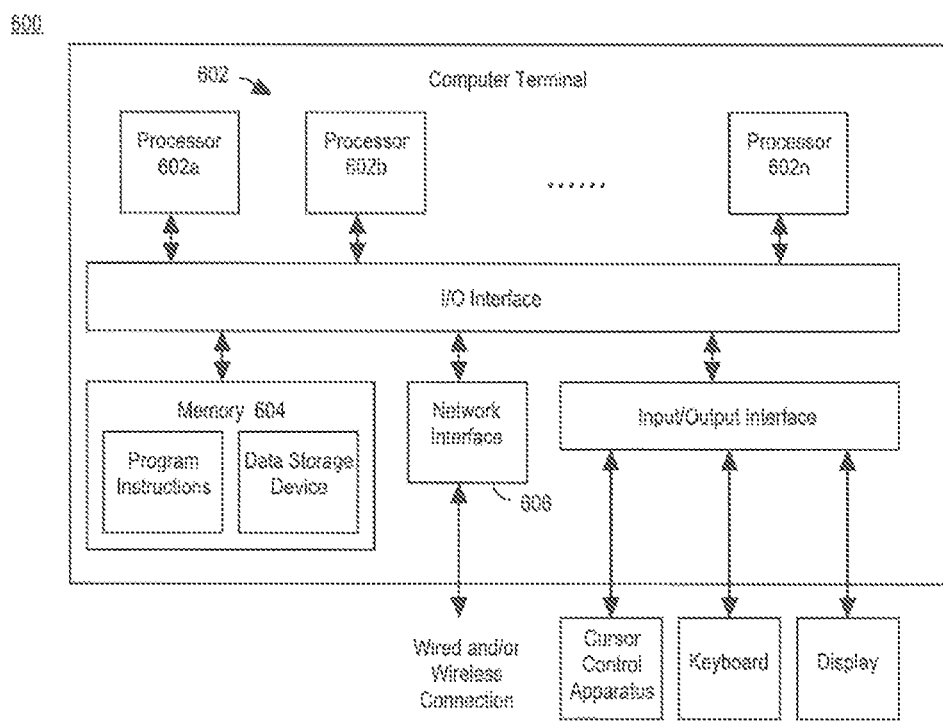
FIG. 6 is a block diagram illustrating an example of a computer terminal 600 (or mobile apparatus) in accordance with the present invention.

FIG. 6 shows a block diagram that illustrates an example of a computer terminal 600 (or mobile apparatus) in accordance with the present invention, Computer terminal 600 can implement a verification method. As shown in FIG. 6, computer terminal 600 (or mobile apparatus) includes one or more (shown as 602*a*, 602*b*, . . . , 602*n* in the figure) processors 602. (Processor 602 may include, but is not limited to, a processing device such as a microprocessor (MCU) or a programmable logic device (FPGA)). Computer terminal 600 also includes a memory 604 configured to store data, and a transmission module 606 configured to implement a communication function. In addition, computer terminal 600 may further comprise: a display, an input/output interface (I/O interface), a universal serial bus (USB) port (which may be included as one of ports of the I/O interface), a network interface, a power source and/or a camera. Those of ordinary skill in the art can understand that the structure shown in FIG. 6 is merely exemplary and does not constitute limitation to the structure of the aforementioned electronic device. For example, computer terminal 600 may further comprise more or fewer components than those shown in FIG. 6, or have a different configuration from that shown in FIG. 6.

It should be noted that the aforementioned one or more processors 602 and/or other data processing circuits may usually be referred to as "data processing circuits" in this text. The data processing circuit may be fully or partially embodied as software, hardware, firmware, or any other combination. In addition, the data processing circuit may be a single independent processing module or fully or partially integrated into any of other elements of computer terminal 600 (or mobile apparatus). As concerned in the embodiment of the present application, the data processing circuit controls (for example, selection of a path of a terminal with variable resistance connected to an interface) as a processor.

Memory 604 may be configured to store software programs of application software and modules, for example, program instructions corresponding to the verification method in the embodiments of the present application/a data storage device. Processor 602 runs the software programs and the modules stored in memory 604 to execute various function applications and data processing, namely, implement the aforementioned verification method. Memory 604 may include a high-speed random access memory, and may further include a non-volatile memory, for example, one or more magnetic storage devices, a flash memory, or another non-volatile solid-state memory. In some examples, memory 604 may further include memories disposed remotely from processor 602, and these remote memories may be connected to computer terminal 600 through a network. Examples of the aforementioned network include, but are not limited to, an internet, an intranet, a local area network, a mobile communication network, and a combination thereof.

Transmission device 606 is configured to receive or send data through a network. A specific example of the aforementioned network may comprise a wireless network provided by a communication provider of computer terminal 600. In one example, transmission device 606 comprises a network adapter (network interface controller, NIC), which may be connected to other network apparatuses through a base station so as to communicate with the Internet. In one example, transmission device 606 may be a radio frequency (RF) module, which is configured to communicate with the Internet in a wireless manner.

The display may be, for example, a touch-screen liquid crystal display (LCD), and the liquid crystal display can enable a user to interact with a user interface of computer terminal 600 (or mobile apparatus).

Processor 602 may invoke information and applications stored in memory 604 through transmission device 606 so as to perform the following steps: acquiring multiple objects; generating an order of the multiple objects; generating a verification image according to the multiple objects, wherein the multiple objects are scattered in a predetermined range to form the verification image; and presenting the verification image and prompt message, wherein the prompt message is used for instructing a user to operate the objects in the verification image according to the order so as to perform verification.

In an embodiment, the aforementioned processor may further execute program code of the following step to present the prompt message: presenting the prompt message using text, or converting the prompt message into a picture and displaying the picture.

In an embodiment, the aforementioned processor may further execute program code of the following steps to convert the prompt message into a picture and display the picture: adding interference information to a region in the picture wherein the prompt message is displayed, and displaying the picture to which the interference information is added. The interference information is used for covering or disturbing a meaning expressed by the prompt message.

In an embodiment, the aforementioned processor may further execute program code of the following step to present the prompt message: sending the prompt message to the user through a short message or instant messaging tool so as to present the prompt message.

In an embodiment, the aforementioned processor may further execute program code of the following steps to, when the objects are pictures, generate the verification image according to the multiple objects: acquiring at least one of the multiple pictures for variation processing, and generating the verification image using the multiple pictures after the variation processing. The variation processing includes one or more of transformation, rotation, scaling, and blurring.

In an embodiment, the aforementioned processor may further execute program code of the following steps: after the verification image is generated according to the multiple objects, determining position information of the multiple objects in the predetermined range. Next, acquiring position information of operations performed by the user in the predetermined range, and recording an order of the position information of the performed operations. Following this, determining whether the order of the position information of the operations performed by the user is consistent with an order of the position information of the multiple objects in the predetermined range. If yes, the verification is successful.

By means of the embodiments of the present application, after multiple objects are acquired, an order of the multiple objects is generated, and a verification image is generated according to the multiple objects, wherein the multiple objects are scattered in a predetermined range to form the verification image. In addition, the verification image and a prompt message are presented, wherein the prompt message is used for instructing a user to operate the objects in the verification image according to the order so as to perform verification. In the aforementioned embodiment, multiple ordered objects are generated, and the multiple ordered objects are scattered in a predetermined range to generate a verification image. A user is prompted to perform verification according to the order of the multiple objects. Since both the objects and the order of the objects are randomly generated, it is difficult for a machine to recognize them, thereby solving the problem of low verification security in the prior art and improving verification security.

Those of ordinary skill in the art can understand that the structure shown in FIG. 6 is merely exemplary, and the computer terminal may also be a terminal apparatus such as a smart phone (for example, an Android phone or an iOS phone), a tablet computer, a palm computer, a mobile Internet device (MID), or a PAD, FIG. 6 does not constitute limitation to the structure of the aforementioned electronic device. For example, computer terminal 600 may further comprise more or fewer components (for example, a network interface or a display device) than those shown in FIG. 6, or have a different configuration from that shown in FIG. 6.

Those of ordinary skill in the art can understand that all or part of the steps in various methods according to the aforementioned embodiments may be implemented by a program instructing relevant hardware of a terminal apparatus. The program may be stored in a computer readable storage medium. The storage medium may comprise: a flash drive, a read-only memory (ROM), a random access memory (RAM), a magnetic disk, an optical disc, or the like.

An embodiment of the present application further provides a storage medium. In an embodiment, the aforementioned storage medium may be used for storing program code executed by the verification method provided in the aforementioned FIGS. 2(*a*) and 2(*b*).

In an embodiment, the aforementioned storage medium may be located in any computer terminal in a computer terminal group in a computer network, or located in any mobile terminal in a mobile terminal group.

In an embodiment, the storage medium is configured to store program code for performing the following steps: acquiring multiple objects; generating an order of the multiple objects; generating a verification image according to the multiple objects, wherein the multiple objects are scattered in a predetermined range to form the verification image; and presenting the verification image and prompt message, wherein the prompt message is used for instructing a user to operate the objects in the verification image according to the order, so as to perform verification.

In an embodiment, the storage medium is configured to store program code for performing the following step to present the prompt message: presenting the prompt message using text, or converting the prompt message into a picture and displaying the picture.

In an embodiment, the storage medium is configured to store program code for performing the following steps to convert the prompt message into a picture and display the picture: adding interference information to a region in the picture wherein the prompt message is displayed, and displaying the picture to which the interference information is added. The interference information is used for covering or disturbing a meaning expressed by the prompt message.

In an embodiment, the storage medium is configured to store program code for performing the following step to present the prompt message: sending the prompt message to the user through a short message or instant messaging tool so as to present the prompt message.

In an embodiment, the storage medium is configured to store program code for performing the following steps to, when the objects are pictures, generate the verification image according to the multiple objects: acquiring at least one of the multiple pictures for variation processing, and generating the verification image using the multiple pictures after the variation processing. The variation processing includes one or more of transformation, rotation, scaling, and blurring.

In an embodiment, the storage medium is configured to store program code for performing the following steps: after the verification image is generated according to the multiple objects, determining position information of the multiple objects in the predetermined range. The steps also include acquiring position information of operations performed by the user in the predetermined range, and recording an order of the position information of the performed operations. The steps further include determining whether the order of the position information of the operations performed by the user is consistent with an order of the position information of the multiple objects in the predetermined range. If yes, the verification is successful.

By means of the embodiment of the present application, after multiple objects are acquired, an order of the multiple objects is generated, and a verification image is generated according to the multiple objects, wherein the multiple objects are scattered in a predetermined range to form the verification image. In addition, the verification image and prompt message are presented, wherein the prompt message is used for instructing a user to operate the objects in the verification image according to the order so as to perform verification. In the aforementioned embodiment, multiple ordered objects are generated, the multiple ordered objects are scattered in a predetermined range to generate a verification image, and a user is prompted to perform verification according to the order of the multiple objects. Since both the objects and the order of the objects are randomly generated, it is difficult for the machine to recognize them, thereby solving the problem of low verification security in the prior art and improving verification security.

The aforementioned sequence numbers of the embodiments of the present application are merely for the convenience of description, and do not imply the preference among the embodiments.

In the aforementioned embodiments of the present application, the description of each embodiment has its own emphasis and, for a part that is not detailed in a certain embodiment, reference can be made to the relevant description of other embodiments.

In a few embodiments provided in the present application, it should be understood that the disclosed technical contents may be implemented in other manners. The device embodiments described above are merely exemplary. For example, the division of units is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, and the indirect couplings or communication connections between units or modules may be implemented in electrical or other forms.

The units described as separate parts may be or may not be physically separate, and the parts shown as units may be or may not be physical units, and not only can be located in one place, but also can be distributed onto multiple network units. Part or all of the units can be chosen to implement the purpose of the solutions of this embodiment according to actual requirements.

In addition, respective functional units in respective embodiments of the present application may be integrated into one processing unit, or respective units may physically exist alone, or two or more units may be integrated into one unit. The integrated unit can be implemented in the form of hardware or in the form of a software functional unit.

When being implemented in the form of a software functional unit and sold or used as a separate product, the integrated unit may be stored in a computer readable storage medium. Based on such understanding, the essence of the technical solutions of the present application or the part that makes contributions to the prior art, or all or part of the technical solutions may be embodied in the form of a software product. The computer software product is stored in a storage medium and includes several instructions for instructing a computer apparatus (which may be a personal computer, a server, a network apparatus, or the like) to perform all or part of the steps in the methods described in the embodiments of the present application. The foregoing storage medium comprises: various media capable of storing program code, such as a USB flash drive, a read-only memory (ROM), a random access memory (RAM), a mobile hard disk, a magnetic disk, or an optical disc.

The above descriptions are merely preferred embodiments of the present application. It should be pointed out that those of ordinary skill in the art can make several improvements and modifications without departing from the principle of the present application, and the improvements and modifications should also be construed as falling within the protection scope of the present application.

What is claimed is:

1. A verification method, comprising:
   generating a random sequence of randomly determined objects;
   generating a verification image that comprises a plurality of object images for the randomly determined objects, and a message that instructs a user to sequentially click on the plurality of object images in the verification image in a specified order, wherein the specified order is set according to the random sequence; and
   converting the message into a picture, wherein the converting the message into the picture comprises adding interference information to the picture, and wherein the adding the interference information to the picture comprises setting a resolution of the plurality of object images and a resolution of the interference information to be different.

2. The verification method of claim 1, wherein the interference information is added to a region in the picture where the message is displayed, the interference information partially covering or disturbing a meaning expressed by the message.

3. The verification method of claim 1, wherein the resolution of the plurality of object images is set higher than the resolution of the interference information.

4. The verification method of claim 1, wherein a difference between the resolution of the plurality of object images and the resolution of the interference information is less than a predetermined difference.

5. The verification method of claim 1, wherein the plurality of object images is scattered in a predetermined range for generating the verification image, and wherein the predetermined range comprises a predetermined size of the verification image.

6. The verification method of claim 1, wherein the randomly determined objects are pre-stored in a database, and wherein upon receiving a verification request, a quantity and a type of an object of the randomly determined objects is determined.

7. The verification method of claim 1, further comprising:
   acquiring a size of each object associated with the plurality of object images; and
   determining a size range corresponding to each object based on the size of each object.

8. The verification method of claim 7, wherein the size of each object is enlarged by a predetermined ratio, and wherein the enlarged size is determined as the size range corresponding to each object.

9. The verification method of claim 1, wherein objects associated with the plurality of object images comprise at least one of words and pictures, and wherein when the objects comprise pictures, the method further comprises:
   acquiring one or more pictures of the pictures for variation processing; and
   generating the verification image after the variation processing of the one or more pictures,
   wherein the variation processing comprises at least one of:
   transformation, rotation, scaling, and blurring of the one or more pictures.

10. The verification method of claim 1, further comprising:
   randomly positioning the plurality of object images within the verification image;
   detecting an order input by the user, wherein the order input by the user comprises a plurality of positions clicked by the user on the verification image;
   determining whether the order input by the user matches the specified order of the plurality of object images; and
   verifying the user to be a human and not a machine when the order input by the user matches the specified order of the plurality of object images.

11. A non-transitory computer-readable medium, having computer executable instructions stored thereon that, when executed by a processor cause the processor to implement a method of verification, the method comprising:
   generating a random sequence of randomly determined objects;
   generating a verification image that comprises a plurality of object images for the randomly determined objects, and a message that instructs a user to sequentially click on the plurality of object images in the verification image in a specified order, wherein the specified order is set according to the random sequence; and
   converting the message into a picture, wherein the converting the message into the picture comprises adding interference information to the picture, and wherein the adding the interference information to the picture comprises setting a resolution of the plurality of object images and a resolution of the interference information to be different.

12. The non-transitory computer-readable medium of claim 11, wherein the interference information is added to a region in the picture where the message is displayed, the interference information partially covering or disturbing a meaning expressed by the message.

13. The non-transitory computer-readable medium of claim 11, wherein the plurality of object images is scattered in a predetermined range for generating the verification image, and wherein the predetermined range comprises a predetermined size of the verification image.

14. The non-transitory computer-readable medium of claim 11, wherein the method further comprises:
   acquiring a size of each object associated with the plurality of object images; and
   determining a size range corresponding to each object based on the size of each object.

15. The non-transitory computer-readable medium of claim 11, wherein objects associated with the plurality of object images comprise at least one of words and pictures, and wherein when the objects comprise pictures, the method further comprises:
   acquiring one or more pictures of the pictures for variation processing; and
   generating the verification image after the variation processing of the one or more pictures,
   wherein the variation processing comprises at least one of:
   transformation, rotation, scaling, and blurring of the one or more pictures.

16. A verification device, comprising:
   a memory that stores instructions; and
   a processor coupled to the memory, wherein the processor is configured to execute the instructions to:
      generate a random sequence of randomly determined objects;
      generate a verification image that comprises a plurality of object images for the randomly determined objects, and a message that instructs a user to sequentially click on the plurality of object images in the verification image in a specified order, wherein the specified order is set according to the random sequence; and
      convert the message into a picture, wherein the converting of the message into the picture comprises adding interference information to the picture, and wherein the adding the interference information to the picture comprises setting a resolution of the plurality of object images and a resolution of the interference information to be different.

17. The verification device of claim 16, wherein the interference information is added to a region in the picture where the message is displayed, the interference information partially covering or disturbing a meaning expressed by the message.

18. The verification device of claim 16, wherein the plurality of object images is scattered in a predetermined range to generate the verification image, and wherein the predetermined range is a predetermined size of the verification image.

19. The verification device of claim 16, wherein the processor is further configured to:
   acquire a size of each object associated with the plurality of object images; and
   determine a size range corresponding to each object based on the size of each object.

20. The verification device of claim 16, wherein objects associated with the plurality of object images comprise at least one of words and pictures, and wherein when the objects comprise pictures, the processor is further configured to:
   acquire one or more pictures of the pictures for variation processing; and
   generate the verification image after the variation processing of the one or more pictures,
   wherein the variation processing comprises at least one of:
   transformation, rotation, scaling, and blurring of the one or more pictures.

* * * * *